(12) United States Patent
Endo et al.

(10) Patent No.: US 9,174,674 B2
(45) Date of Patent: Nov. 3, 2015

(54) PARKING ASSISTING APPARATUS

(75) Inventors: Tomohiko Endo, Toyota (JP); Yasushi Makino, Mishima (JP); Yukiko Kawabata, Toyota (JP); Takuya Itoh, Kuwana (JP); Atsuko Nakanishi, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 576 days.

(21) Appl. No.: 12/838,529

(22) Filed: Jul. 19, 2010

(65) Prior Publication Data

US 2010/0286872 A1 Nov. 11, 2010

Related U.S. Application Data

(63) Continuation of application No. PCT/JP2009/051113, filed on Jan. 23, 2009.

(30) Foreign Application Priority Data

Feb. 18, 2008 (JP) ................. 2008-036007

(51) Int. Cl.
*B62D 15/02* (2006.01)
*B62D 7/15* (2006.01)
*B60W 30/06* (2006.01)

(52) U.S. Cl.
CPC .............. *B62D 7/159* (2013.01); *B62D 15/027* (2013.01); *B62D 15/0285* (2013.01)

(58) Field of Classification Search
CPC .... B62D 15/0285; B62D 6/00; B62D 7/1509; B62D 15/027; B62D 11/001; B60T 2201/10; B60W 30/06
See application file for complete search history.

(56) References Cited

U.S. PATENT DOCUMENTS

| | | | | |
|---|---|---|---|---|
| 4,931,930 A | * | 6/1990 | Shyu et al. ....................... 701/36 |
| 5,996,722 A | * | 12/1999 | Price ............................ 180/403 |
| 8,538,631 B2 | * | 9/2013 | Lee et al. ....................... 701/41 |
| 8,988,250 B2 | * | 3/2015 | Suzuki et al. ............... 340/932.2 |
| 2001/0026317 A1 | * | 10/2001 | Kakinami et al. ............ 348/148 |
| 2002/0035425 A1 | * | 3/2002 | Deguchi et al. ................. 701/41 |
| 2003/0156045 A1 | * | 8/2003 | Tanaka et al. .............. 340/932.2 |
| 2004/0267423 A1 | * | 12/2004 | Iwazaki et al. .................. 701/41 |
| 2005/0021203 A1 | * | 1/2005 | Iwazaki et al. .................. 701/36 |
| 2005/0236201 A1 | * | 10/2005 | Spannheimer et al. ........ 180/204 |
| 2005/0236896 A1 | * | 10/2005 | Offerle et al. ................. 303/146 |
| 2006/0235590 A1 | * | 10/2006 | Bolourchi et al. .............. 701/41 |

(Continued)

FOREIGN PATENT DOCUMENTS

| | | |
|---|---|---|
| JP | 4-356277 | 12/1992 |
| JP | 8-91238 | 4/1996 |

(Continued)

*Primary Examiner* — Ryan Zeender
*Assistant Examiner* — Dana Amsdell
(74) *Attorney, Agent, or Firm* — Oblon, McClelland, Maier & Neustadt, L.L.P.

(57) ABSTRACT

The present invention relates to a parking assist apparatus 10 used for a vehicle which has a four-wheel steering mode in which front wheels and rear wheels can be steered independently, comprising: traveling path calculation means for calculating a traveling path for guiding the vehicle to a target position; and assist means for assisting traveling of the vehicle to the target position, based on the traveling path calculated by the traveling path calculation means. In the four-wheel steering mode, the traveling path calculated by the traveling path calculation means includes a traveling path in which the front wheels and the rear wheels are steered in reverse directions, and said traveling path includes a section in which a constant point, which is an intersection of a center line of the vehicle in a back-and-forth direction and a line perpendicular to the center line from a turning center, creates a trajectory of a clothoid curve.

12 Claims, 5 Drawing Sheets

(56) References Cited

U.S. PATENT DOCUMENTS

| | | | |
|---|---|---|---|
| 2007/0146166 A1* | 6/2007 | Sato et al. | 340/932.2 |
| 2008/0255728 A1* | 10/2008 | Ottenhues et al. | 701/41 |
| 2009/0125181 A1* | 5/2009 | Luke et al. | 701/36 |

FOREIGN PATENT DOCUMENTS

| | | |
|---|---|---|
| JP | 10-230862 | 9/1998 |
| JP | 2000-128008 | 5/2000 |
| JP | 2001-334951 | 12/2001 |
| JP | 2003-507263 | 2/2003 |
| JP | 2005-14738 | 1/2005 |
| JP | 2005-255170 | 9/2005 |
| JP | 2006-8009 | 1/2006 |
| JP | 2006-44460 | 2/2006 |
| JP | 2006-508850 | 3/2006 |
| JP | 2007-99209 | 4/2007 |
| JP | 2007-302218 | 11/2007 |
| JP | 2008-501563 | 1/2008 |

* cited by examiner

PARKING ASSISTING APPARATUS

TECHNICAL FIELD

The present invention relates to a parking assist apparatus used for a vehicle which has a four-wheel steering mode in which front wheels and rear wheels can be steered independently.

BACKGROUND ART

JP2006-8009 A discloses a parking assist apparatus used for a vehicle in which only front wheels can be steered, wherein a traveling path for guiding a vehicle to a target position is calculated using a rear axle center of the vehicle as a reference point. The calculated traveling path includes a section in which the reference point creates a trajectory of a clothoid curve. Further, in JP2006-8009 A, the following is described; in the case of the vehicle having a four-wheel steering mechanism, it is possible to implement the traveling of the vehicle along a target travel trajectory by steering rear wheels, while performing steering control according to a steering control pattern.

In the case of a vehicle (referred to as a 2WS vehicle, hereafter) in which only front wheels can be steered, a turning center is always located on an extended line of a rear wheel axle of the vehicle. Thus, when a turning curvature of the vehicle is increased in proportion to an amount of movement of the vehicle, an axle center of the rear wheels (i.e., a rear axle center) of the vehicle creates a trajectory of a clothoid curve. Therefore, if the traveling path is calculated using the axle center of the rear wheels as a reference point as disclosed in JP2006-256356 A, there are advantages in that the path can be calculated easily using the clothoid curve and thus the calculation workload or the like can be reduced.

However, in the case of a vehicle having a four-wheel steering mechanism (referred to as a 4WS vehicle, hereafter), that is to say, in the case of a vehicle which has a four-wheel steering mode in which the front wheels and the rear wheels can be steered independently, when the front wheels and the rear wheels are steered simultaneously, the turning center moves in a forward direction of the vehicle and thus the trajectory of the rear axle center of the vehicle no longer becomes a clothoid curve. Further, in the case of the 4WS vehicle, when the front wheels and the rear wheels are steered simultaneously, the turning center moves in a back-and-forth direction as well as a lateral direction of the vehicle, depending on a relationship between steering angles of the front wheels and the rear wheels, which makes the generation of the traveling path difficult.

DISCLOSURE OF INVENTION

Therefore, an object of the present invention is to provide a parking assisting apparatus which can use a traveling path including a clothoid curve even in the case of the 4WS vehicle.

The aforementioned objects are achieved by the present invention defined in claims.

According to the present invention, a parking assisting apparatus, which can use a traveling path including a clothoid curve even in the case of the 4WS vehicle, can be obtained.

BRIEF DESCRIPTION OF THE DRAWINGS

These and other objects, features, and advantages of the present invention will become more apparent from the following detailed description of preferred embodiments given with reference to the accompanying drawings, in which.

EXPLANATION FOR REFERENCE NUMBER

Figure 1:
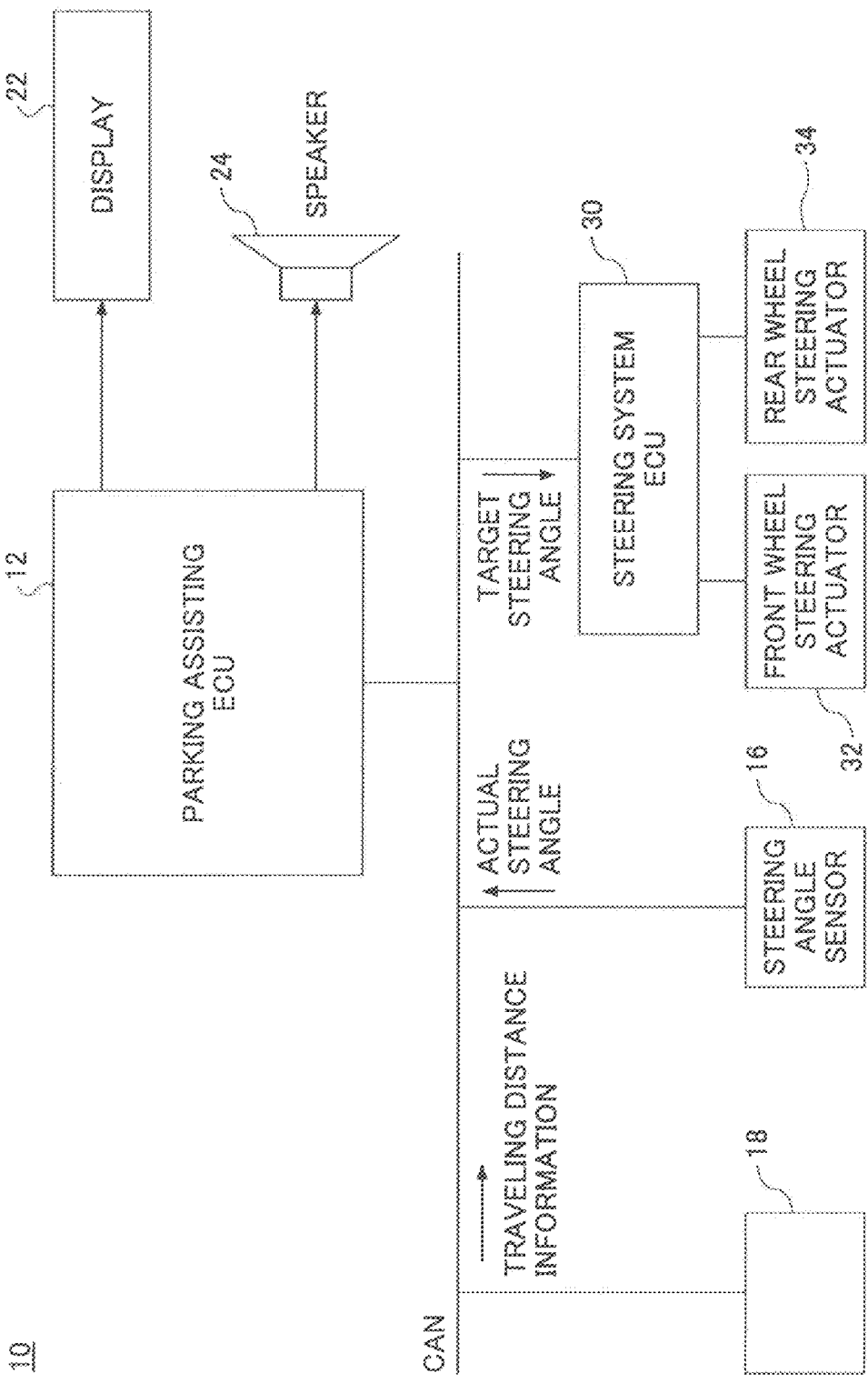
FIG. 1 is a system diagram of an embodiment of a parking assisting apparatus 10 according to the present invention.

10 parking assisting apparatus
12 parking assisting ECU
16 steering angle sensor
18 vehicle speed sensor
22 display
24 speaker
30 steering system ECU
32 front wheel steering actuator
34 rear wheel steering actuator

BEST MODE FOR CARRYING OUT THE INVENTION

In the following, the best mode for carrying out the present invention will be described in detail by referring to the accompanying drawings.

FIG. 1 is a system diagram of an embodiment of a parking assisting apparatus 10 according to the present invention. As shown in FIG. 1, the parking assisting apparatus 10 is comprised mainly of an electronic control unit 12 (hereafter referred to as a parking assisting ECU 12). The parking assisting ECU 12 is comprised mainly of a microprocessor that includes a CPU, a ROM, a RAM, etc., (not shown) which are interconnected via appropriate buses. In the ROM are stored the computer readable programs to be executed by the CPU and data.

To the parking assisting ECU 12 are connected a steering system ECU 30, a steering angle sensor 16 for detecting the steering angle of the steering wheel (not shown) which is operated by a driver, and a vehicle speed sensor 18 for detecting the speed of the vehicle, via appropriate buses such as a CAN (Controller Area Network) or a high-speed communication bus. The vehicle speed sensor 18 may be wheel speed sensors provided on individual wheels, each of which generates pulse signals according to the rotating speed of the corresponding wheel.

The steering system ECU 30 is connected to a front wheel steering actuator 32 and a rear wheel steering actuator 34. The front wheel steering actuator 32 may be a motor which is disposed in a steering column or a steering gear box, for example, and is provided for rotating a steering shaft through its rotating angle. Alternatively, the front wheel steering actuator 32 may be a motor for providing translational motion of a rack shaft through its rotating angle, via a ball screw mechanism, for example. The rear wheel steering actuator 34 may be shared with left and right rear wheels, or may be provided independently for each of the left and right rear wheels. It is noted that the steering mechanism of the rear wheels may be arbitrary, as long as the left and right rear wheels can be steered through a desired steering angle and in a mechanically dependent manner with respect to the front steering mechanism by the way of electronic control.

The steering system ECU 30 controls the front wheel steering actuator 32 and the rear wheel steering actuator 34 based on target steering angles (target tire steered angles) of the front and rear wheels supplied from the parking assisting ECU 12 so as to implement the respective target steering angles of the front and rear wheels.

Next, a main function implemented by the parking assisting ECU 12 according to the embodiment is described.

When a target parking position is set, the parking assisting ECU 12 calculates a traveling path of the vehicle for guiding the vehicle from the current vehicle position to the target parking position. The target parking position may be set automatically or manually. Further, the target parking position referred to herein is not necessarily a final target parking position, and thus it may be a provisional target parking position (which may be corrected afterward). For example, the target parking position may be set automatically based on detection results of a parking space which is detected based on data of a row of points from a clearance sonar (not shown). Further, for example, the target parking position may be set manually by a user who moves a pictorial display which imitates an actual parking frame and represents the target parking position on an image screen of a rear camera displayed on a display 22.

Figure 2:
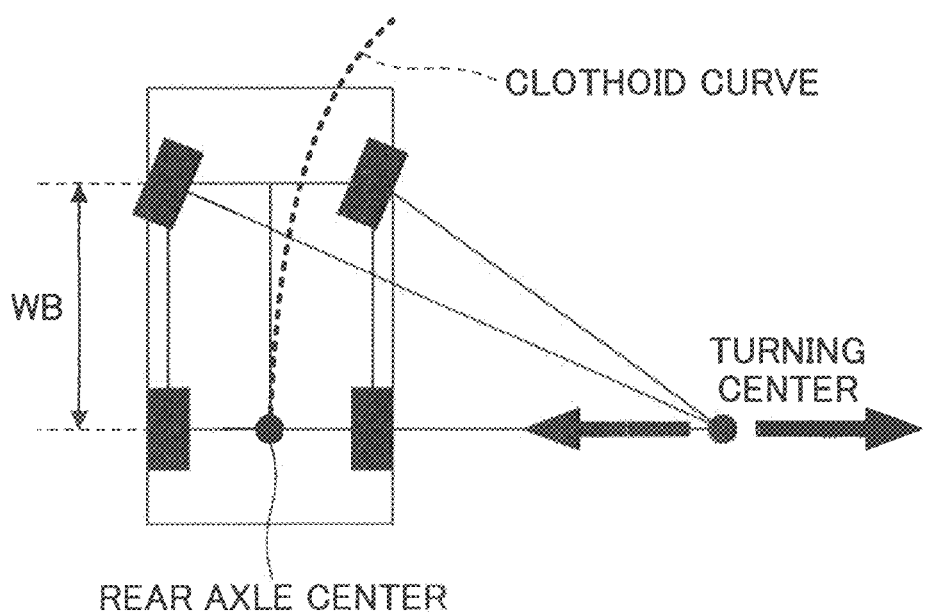
FIG. 2 is a diagram for schematically showing motion of a turning center in the case of a 2WS vehicle.

Here, in the case of the 2WS vehicle, as schematically shown in FIG. 2, a turning center is always located on an extended line of a rear wheel axle of the vehicle. Thus, when a turning curvature of the vehicle is increased in proportion to an amount of movement of the vehicle such as in sections A and B shown in FIG. 3, an axle center of the rear wheels (i.e., a rear axle center) of the vehicle creates a trajectory of a clothoid curve.

Figure 4:
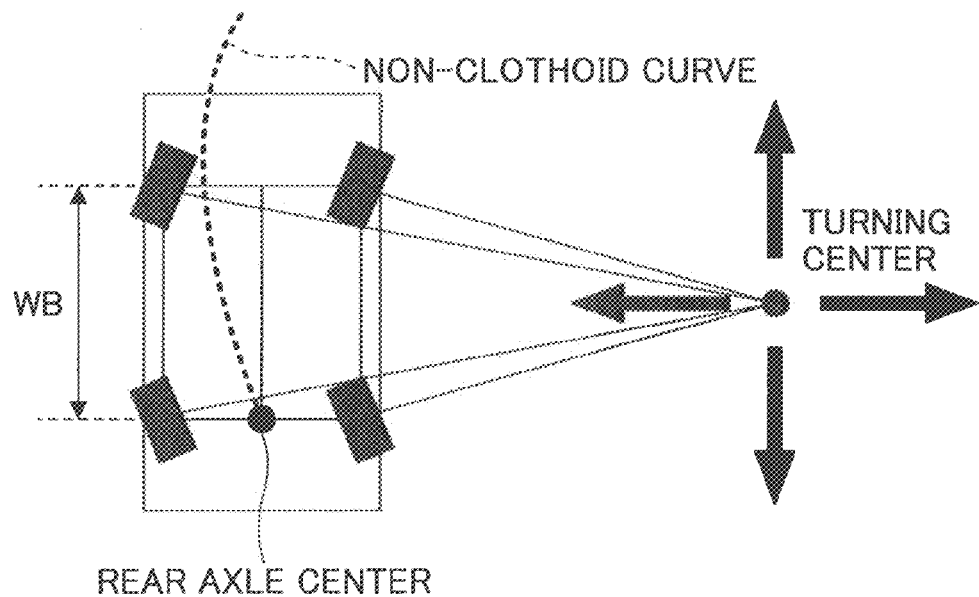
FIG. 4 is a diagram for schematically showing motion of a turning center in the case of a 4WS vehicle.

To the contrary, in the case of the 4WS vehicle such as the vehicle in this embodiment, when the front and rear wheels are steered in reverse directions, the turning center moves not only in a lateral direction of the vehicle but also a back-and-forth direction of the vehicle, depending on a relationship of the steering angles of the front and rear wheels, as schematically shown in FIG. 4. As a result, the trajectory of the rear axle center of the vehicle no longer becomes a clothoid curve. For this reason, if the traveling path is calculated using the rear axle center as a reference point, the traveling path cannot be generated using a clothoid curve, which makes the calculation of the traveling path complicated.

Figure 5:
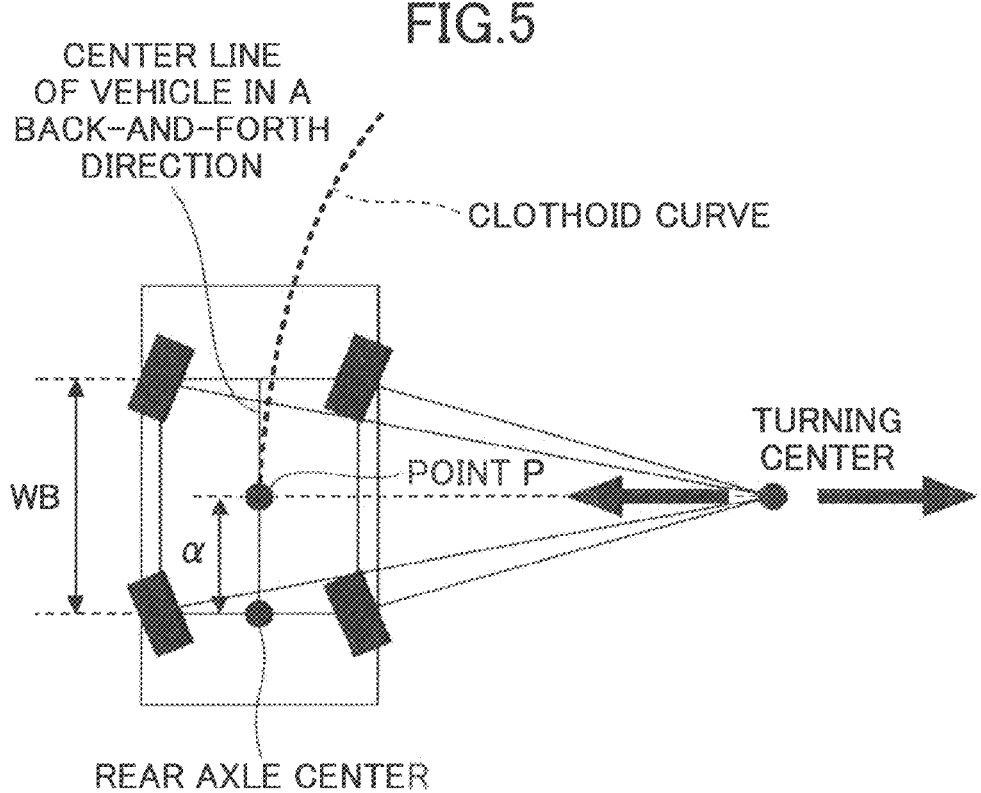
FIG. 5 is a diagram for schematically showing a reference point of the traveling path used in the present embodiment.

Therefore, in the present embodiment, a point P, which is an intersection of a center line of the vehicle in a back-and-forth direction of the vehicle (in a plan view in a vertical down direction from upper side of the vehicle) and a line perpendicular to the center line in the back-and-forth direction from a turning center, is used as the reference point, as schematically shown in FIG. 5. Here, in order that the point P creates a trajectory of a clothoid curve, it is necessary that the point P does not move in a back-and-forth direction with respect to the rear axle center even if the turning curvature changes. Thus, it is necessary to make the turning center move only in the lateral direction of the vehicle, as schematically shown in FIG. 5. For this reason, in the present embodiment, the relationship of the steering angles between the front and rear wheels during the turning operation of the vehicle is constrained in such a manner that the point P does not move in a back-and-forth direction. Specifically, the relationship of the steering angles between the front and rear wheels during the turning operation of the vehicle is constrained in such a manner that the following relationship is met.

$$\theta_R = \tan^{-1}\left(\frac{T \cdot \tan\theta_F}{1-T}\right) \quad \text{Formula (1)}$$

Figure 6:
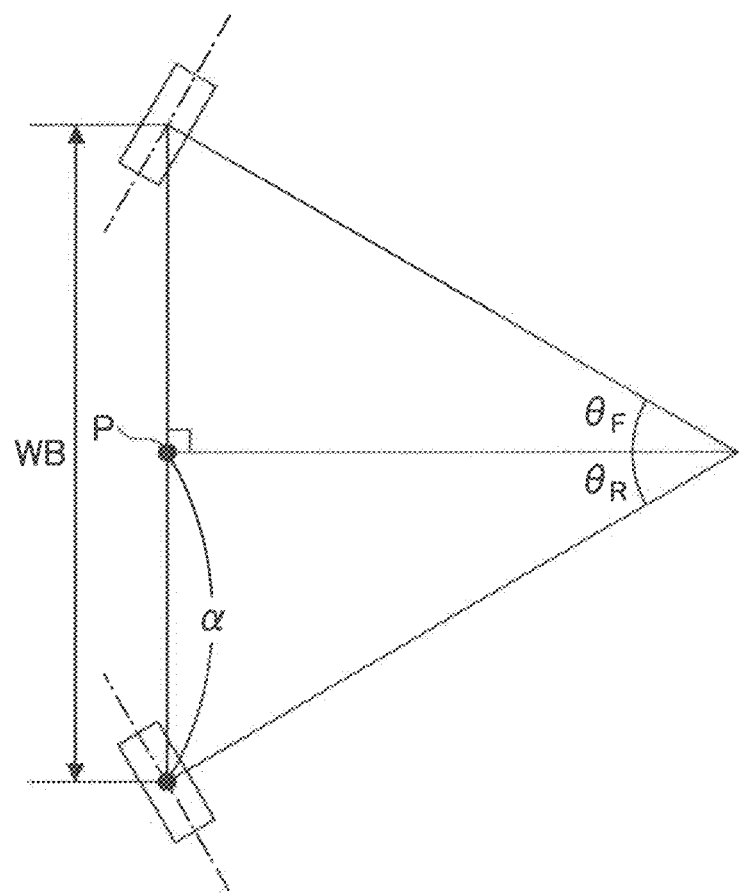
FIG. 6 is a diagram for showing significance of a formula using a two-wheel model of the vehicle.

It is noted that the relationship expressed by the formula (1) is derived using a two-wheel model (a simplified model) of the vehicle as shown in FIG. 6. Therefore, in formula (1), $\theta_F$ indicates a magnitude of an average of tire steered angles of left and right front wheels, and $\theta_R$ indicates a magnitude of an average of tire steered angles of left and right rear wheels. Further, in formula (1), T is a constant and is expressed by T=α/WB, using a distance α from a rear axle center on the center line in a back-and-forth direction of the vehicle to the reference point P (a distance in a two-dimensional view), and a wheel base length WB, as schematically shown in FIG. 5.

Figure 3:
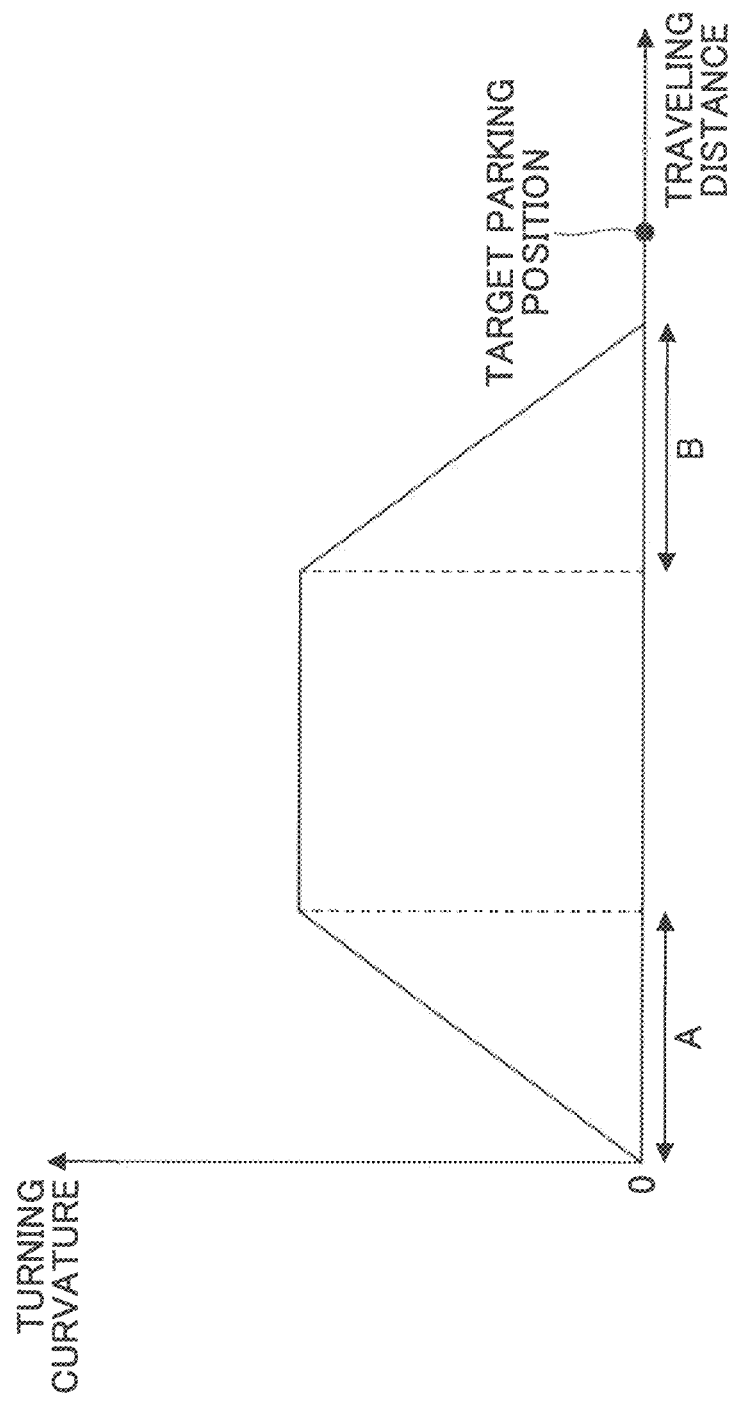
FIG. 3 is a diagram for schematically showing an example of a relationship between a travel distance of the vehicle and a turning curvature.

In this way, according to the present embodiment, since it is possible to generate the traveling path using a clothoid curve, the parking assisting ECU 12 generates a traveling path, which includes a clothoid curve, using the point P as the reference point. The traveling path may include a section of a line and a section of a circle other than a section of a clothoid curve. Further, the clothoid curve may be set in various manners by varying a gradient of a turning curvature with respect to a traveling distance as shown in FIG. 3. Further, the traveling path including a clothoid curve may be determined by appropriately considering a positional relationship between the current vehicle position and the target parking position, a maximum turning curvature of the vehicle, etc. For example, an initial traveling path may be generated by using a certain turning curvature less than a maximum turning curvature (e.g., 90 percent of the maximum turning curvature) of the vehicle in order to enable the correction of the target track in a later stage. It is noted that in the case of the 4WS vehicle, since a minimum turning radius can be smaller than that in the case of the 2WS vehicle, it is possible to generate the traveling path utilizing this high turning performance.

After the parking assisting ECU 12 calculates the traveling path of the vehicle (refereed to as "a target traveling path" hereafter) for guiding the vehicle from the current vehicle position to the target parking position as mentioned above, the parking assisting ECU 12 performs the parking assist for guiding the vehicle to the target parking position, based on the calculated target parking position. Specifically, at first the parking assisting ECU 12 calculates the target steering angles (the target values of a tire steered angle) of the front and rear wheels at the respective points on the target traveling path in such a manner that the point P moves along the target traveling path. Here, the tire steered angles of the front and rear wheels which implement the respective turning curvatures of the vehicle at the respective points on the target traveling path and meet the relationship indicated by the formula (1) are determined uniquely from the turning curvatures. This relationship (i.e., the relationship between the turning curvature and the tire steered angles of the front and rear wheels at this turning curvature) may be derived in advance by experiment or the like and stored as a turning characteristics map. It is noted that if the target traveling path includes a section of a line and a section of a circle other than a section of a clothoid curve, the tire steered angles of the front and rear wheels that meet the relationship indicated by the formula (1) are calculated as target steering angles not only in the section of the clothoid curve but also in the section of the line and the section of the circle. In this case, in the section of the line the target steering angles of the front and rear wheels are zero (i.e., a nominal angle).

After the parking assisting ECU 12 thus determines the target steering angles of the front and rear wheels at the respective points on the target traveling path, the parking assisting ECU 12 estimates and monitors the position of the vehicle on the target traveling path (i.e., the amount of the movement of the vehicle) based on the output signal (pulses representing a wheel speed) of the vehicle speed sensor 18 and an actual steering angle obtained from the steering sensor 16, and transmits the target steering angles of the front and rear wheels at the estimated position to the steering system ECU 30. In response to this, the steering system ECU 30 controls the front wheel steering actuator 32 and the rear wheel steering actuator 34 so as to implement the respective target steering angles of the front and rear wheels. It is noted that if the vehicle position deviates from the target traveling path, the parking assisting ECU 12 may calculate again a new target traveling path according to the deviation to calculate new target steering angles, or the parking assisting ECU 12 may calculate new target steering angles which are reflected by correction steering angles for compensating for the deviation in order to return to the original target traveling path.

According to the parking assisting apparatus 10 of this embodiment, the following effect among others can be obtained.

As described above, since the constant point P, which is an intersection of a center line of the vehicle in a back-and-forth direction and a line perpendicular to the center line from a turning center, is used as the reference point in calculating the traveling path, it is possible to generate the traveling path including a clothoid curve even in the case of the 4WS vehicle. With this arrangement, it is possible to perform the generation of the traveling path and the calculation of the amount of the movement of the vehicle easily. Further, since it is possible to generate the traveling path including a clothoid curve, it is possible to use traveling path generating logic, which is used for the 2WS vehicle, even for the 4WS vehicle, which reduces design engineering workload. It is noted that the traveling path generating logic used for the 2WS vehicle may be available as it is just by compensating for (i.e., offsetting) the deviation α between the reference point (i.e., the rear axle center) used for the 2WS vehicle and the aforementioned reference point (see FIG. 5). However, in the case of the 4WS vehicle, since steering the front wheels and the rear wheels in reverse directions makes the maximum curvature greater than that of the 2WS vehicle, it is useful to generate a traveling path with small turning radii utilizing such characteristics.

It is noted that in the present embodiment, "traveling path calculation means" in claims is implemented by the parking assisting ECU 12, and "assist means" in claims is implemented by the parking assisting ECU 12 and the steering system ECU 30 in cooperation.

The present invention is disclosed with reference to the preferred embodiment. However, it should be understood that the present invention is not limited to the above-described embodiment, and variations and modifications may be made without departing from the scope of the present invention.

For example, in the above embodiment, the relationship of the steering angles between the front and rear wheels during the turning operation of the vehicle is constrained in such a manner that the relationship indicated by the formula (1) is met using a two-wheel model of the vehicle such as shown in FIG. 6, in order that the point P does not change as a "constant" point during the turning operation of the vehicle; however, other constraint conditions may be established by utilizing analysis results of different models or simulations, experiment results (for example, experimental results of a trajectory of the point P based on solutions of vehicle position using GPS, etc. In the final analysis, it is important that the point P, which is an intersection of the center line of the vehicle in a back-and-forth direction and a line perpendicular to the center line from a turning center at an arbitrary vehicle position within a section which is to be a clothoid section, creates a trajectory of a clothoid curve during that section. It is noted that the clothoid curve is a curve in which a gradient of a change in curvature with respect to a traveling distance of the vehicle is constant as shown in FIG. 3; however, an actual trajectory of the point P may not be a complete clothoid curve due to an influence of control errors, etc.

Further, in the above embodiment the target parking position is used as the target position in calculating the traveling path to the target parking position; however, the target position is not limited to such a target parking position. For example, in the case of performing the parking assist for steering operation, etc., during the forward traveling toward a parking start position (i.e., a position from which the reverse traveling is to be initiated with shifting a transmission gear into a reverse position) from which parking in the target parking position is possible, the concept of the embodiment is used to calculate the traveling path toward the parking start position.

Further, the above embodiment is applicable not only to the calculation method of calculating the traveling path at the reverse (backward) traveling of the vehicle for parking but also to the calculation method of calculating the traveling path at the forward traveling of the vehicle for parking. For example, in the case of performing the parking assist for steering operation, etc., during the forward traveling toward the parking start position from which parking to the target parking position is possible, the concept of the embodiment is used to calculate the traveling path for the forward traveling of the vehicle.

Further, in the above embodiment, the parking assist is performed by automatically steering wheels based on the target path; however, the way of the parking assist is not limited to this. For example, the parking assist may be performed by outputting a guidance speech and/or a guidance image for guiding a manner of steering the front wheels (i.e., a manner of operating the steering wheel) via the display 22 and/or the speaker 24 (see FIG. 1) based on the target steering angles of the front wheels calculated based on the target traveling path as mentioned above. In this case, the front wheel steering actuator 32 is not necessary, and the parking assisting ECU 12 may only control the rear wheel steering actuator 34 based on the actual steering angle and the target steering angle in such a manner that the relationship indicated by the formula (1) is maintained, during the section of the clothoid curve.

Further, in the above embodiment, the target steering angle is used as the target value during the parking assist; however, any physical quantity can be used as long as it is related to the steering angle. For example, an amount of a rack axis of the front steering mechanism, current/voltage to be applied to a motor as the front wheel steering actuator 32, etc., can be used as the target value. Similarly, a relationship substantially equivalent to the relationship expressed by the formula (1) can be expressed by any physical quantity as long as it is related to the steering angle. For example, a relationship substantially equivalent to the relationship expressed by the formula (1) can be expressed using an amount of a rack axis of the front steering mechanism, current/voltage to be applied to a motor as the front wheel steering actuator 32, etc.

Further, in the above embodiment, only the parking assist using a four-wheel steering mode is described; however, in the vehicle equipped with the four-wheel steering mechanism it is possible to selectively use a four-wheel steering mode or two-wheel steering mode according to the situation. Therefore, which of the four-wheel steering mode and the two-wheel steering mode is to be implemented may be selected by a user or be switched automatically. In this case, the reference point used in calculating the traveling path may be changed between in the case of steering in the two-wheel steering mode and in the case of steering in the four-wheel steering mode. Specifically, in the four-wheel steering mode the above-described point P is used as the reference point, while in the two-wheel steering mode the rear axle center is used as the reference point. In this case, with respect to the clothoid section defined by the clothoid curve in the traveling path, the steering system ECU 30 steers the front and rear wheels in reverse directions in such a manner that the point P creates a trajectory along the clothoid curve as described above in the four-wheel steering mode, while the steering system ECU 30 steers the front wheels in such a manner that the rear axle center creates a trajectory along the clothoid curve in the two-wheel steering mode.

Further, in the above embodiment, the vehicle with four wheels in which the front wheels and the rear wheels can be steered independently is considered; however, the present invention can be applied to any vehicle with any wheel configuration, such as a vehicle having a front wheel and two rear wheels in which the front wheel and the rear wheels can be steered independently.

Further, in the above embodiment, share of the functions between the parking assisting ECU 12 and the steering system ECU 30 is only an example, and a part or all of the steering system ECU 30 may be implemented by the parking assisting ECU 12 or another ECU.

The present application is based on Japanese Priority Application No. 2008-36007, filed on Feb. 18, 2008, the entire contents of which are hereby incorporated by reference.

The invention claimed is:

1. A parking assist apparatus used for a vehicle which has a four-wheel steering mode in which front wheels and rear wheels can be steered independently, comprising:
    traveling path calculation means for calculating a traveling path for guiding the vehicle to a target position; and
    assist means for assisting traveling of the vehicle for parking to the target position, based on the traveling path calculated by the traveling path calculation means,
    wherein in the four-wheel steering mode, the traveling path calculated by the traveling path calculation means includes a traveling path in which the front wheels and the rear wheels are steered in reverse directions, and said traveling path includes a section in which a constant point, which is an intersection of a center line of the vehicle in a back-and-forth direction and a line perpendicular to the center line from a turning center, traces a trajectory of a clothoid curve, the clothoid curve including a curve in which a gradient of a change in curvature with respect to a traveling distance of the vehicle is constant, and the constant point does not move along the center line of the vehicle during a turning of the vehicle.

2. The parking assist apparatus as claimed in claim 1, wherein in the four-wheel steering mode, the assist means calculates target values related to steering angles of the front wheels and the rear wheels to be implemented at an arbitrary position in the traveling path, based on the traveling path calculated by the traveling path calculation means, and assists traveling of the vehicle for parking to the target position, based on the target values, and
    in the four-wheel steering mode, a relationship between the target values related to steering angles of the front wheels and the target values related to steering angles of the rear wheels in the section of the clothoid curve is a constant relationship determined by a position of the constant point on the center line and a wheel base length.

3. The parking assist apparatus as claimed in claim 2, wherein in the four-wheel steering mode, the relationship between the target values related to steering angles of the front wheels and the target values related to steering angles of the rear wheels in the section of the clothoid curve is given by a constant relationship $$\theta_R = \tan^{-1}\left(\frac{T \cdot \tan\theta_F}{1 - T}\right),$$

when the target values related to steering angles of the front wheels are expressed by a magnitude $\theta_F$ of a steered angle of tires of the front wheels and the target values related to steering angles of the rear wheels are expressed by a magnitude $\theta_R$ of a steered angle of tires of the rear wheels, where T is a constant which is expressed by $T=\alpha/WB$, using a distance $\alpha$ from a rear axle center on the center line to the constant point, and a wheel base length WB.

4. A parking assist apparatus used for a vehicle which has a four-wheel steering mode in which front wheels and rear wheels can be steered independently, comprising:
    traveling path calculation means for calculating a traveling path for guiding the vehicle to a target position; and
    assist means for assisting traveling of the vehicle for parking to the target position, based on the traveling path calculated by the traveling path calculation means,
    wherein in the four-wheel steering mode, the traveling path calculated by the traveling path calculation means includes a clothoid section defined by a clothoid curve, and
    in the four-wheel steering mode, the assist means steers the front wheels and the rear wheels in reverse directions in such a manner that a constant point, which is an intersection of a center line of the vehicle in a back-and-forth direction and a line perpendicular to the center line from a turning center, traces a trajectory along the clothoid curve in the clothoid section, the clothoid curve including a curve in which a gradient of a change in curvature with respect to a traveling distance of the vehicle is constant, and the constant point does not move along the center line of the vehicle during a turning of the vehicle.

5. A parking assist apparatus used for a vehicle which has a four-wheel steering mode in which front wheels and rear wheels can be steered independently, comprising:
    a traveling path calculation part configured to calculate a traveling path for guiding the vehicle to a target position; and
    an assist part configured to assist traveling of the vehicle for parking to the target position, based on the traveling path calculated by the traveling path calculation part,
    wherein in the four-wheel steering mode, the traveling path calculated by the traveling path calculation part includes a traveling path in which the front wheels and the rear wheels are steered in reverse directions, and said traveling path includes a section in which a constant point, which is an intersection of a center line of the vehicle in a back-and-forth direction and a line perpendicular to the center line from a turning center, traces a trajectory of a clothoid curve, the clothoid curve including a curve in which a gradient of a change in curvature with respect to a traveling distance of the vehicle is constant, and the constant point does not move along the center line of the vehicle during a turning of the vehicle.

6. A parking assist apparatus used for a vehicle which has a four-wheel steering mode in which front wheels and rear wheels can be steered independently, comprising:
   a traveling path calculation part configured to calculate a traveling path for guiding the vehicle to a target position; and
   an assist part configured to assist traveling of the vehicle for parking to the target position, based on the traveling path calculated by the traveling path calculation part,
   wherein in the four-wheel steering mode, the traveling path calculated by the traveling path calculation means includes a clothoid section defined by a clothoid curve, and
   in the four-wheel steering mode, the assist part steers the front wheels and the rear wheels in reverse directions in such a manner that a constant point, which is an intersection of a center line of the vehicle in a back-and-forth direction and a line perpendicular to the center line from a turning center, traces a trajectory along the clothoid curve in the clothoid section, the clothoid curve including a curve in which a gradient of a change in curvature with respect to a traveling distance of the vehicle is constant, and the constant point does not move along the center line of the vehicle during a turning of the vehicle.

7. The parking assist apparatus as claimed in claim 1, wherein the assist means assists the constant point along the trajectory of the clothoid curve with the turning center being movable only in a lateral direction of the vehicle.

8. The parking assist apparatus as claimed in claim 4, wherein the assist means assists the constant point along the trajectory of the clothoid curve with the turning center being movable only in a lateral direction of the vehicle.

9. The parking assist apparatus as claimed in claim 5, wherein the assist part assists the constant point along the trajectory of the clothoid curve with the turning center being movable only in a lateral direction of the vehicle.

10. The parking assist apparatus as claimed in claim 6, wherein the assist part assists the constant point along the trajectory of the clothoid curve with the turning center being movable only in a lateral direction of the vehicle.

11. The parking assist apparatus as claimed in claim 5, wherein in the four-wheel steering mode, the assist part calculates target values related to steering angles of the front wheels and the rear wheels to be implemented at an arbitrary position in the traveling path, based on the traveling path calculated by the traveling path calculation part, and assists traveling of the vehicle for parking to the target position, based on the target values, and
   in the four-wheel steering mode, a relationship between the target values related to steering angles of the front wheels and the target values related to steering angles of the rear wheels in the section of the clothoid curve is a constant relationship determined by a position of the constant point on the center line and a wheel base length.

12. The parking assist apparatus as claimed in claim 11, wherein in the four-wheel steering mode, the relationship between the target values related to steering angles of the front wheels and the target values related to steering angles of the rear wheels in the section of the clothoid curve is given by a constant relationship $$\theta_R = \tan^{-1}\left(\frac{T \cdot \tan\theta_F}{1-T}\right),$$

when the target values related to steering angles of the front wheels are expressed by a magnitude $\theta_F$ of a steered angle of tires of the front wheels and the target values related to steering angles of the rear wheels are expressed by a magnitude $\theta_R$ of a steered angle of tires of the rear wheels, where T is a constant which is expressed by T=α/WB, using a distance α from a rear axle center on the center line to the constant point, and a wheel base length WB.

* * * * *